US006371438B1

(12) United States Patent
Boecking

(10) Patent No.: US 6,371,438 B1
(45) Date of Patent: Apr. 16, 2002

(54) CONTROL VALVE FOR AN INJECTOR THAT INJECTS FUEL INTO A CYLINDER OF AN ENGINE

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/642,772

(22) Filed: Aug. 22, 2000

(30) Foreign Application Priority Data

Aug. 25, 1999 (DE) ........................................ 199 40 300

(51) Int. Cl.[7] .......................... F16K 31/12; F16K 31/02
(52) U.S. Cl. ..................................... 251/57; 251/129.06
(58) Field of Search .............................. 251/57, 129.06, 251/12, 30.01, 129.07

(56) References Cited

U.S. PATENT DOCUMENTS 4,681,136 A * 7/1987 Sequeira et al. ............ 137/494
4,762,300 A * 8/1988 Inagaki et al. ......... 251/129.06
5,218,997 A * 6/1993 Dunwoody ............ 137/596.18
6,021,760 A * 2/2000 Boecking .................... 123/467
6,076,800 A * 6/2000 Heniz et al. ........... 251/129.06
6,085,719 A * 6/2000 Heniz et al. ................ 123/300
6,142,443 A * 11/2000 Potschin et al. .............. 251/57
6,168,133 B1 * 1/2001 Heinz et al. .................. 251/57
6,189,815 B1 * 2/2001 Potschin et al. ......... 239/533.2

* cited by examiner

*Primary Examiner*—Philippe Derakshani
*Assistant Examiner*—David A Bonderer
(74) *Attorney, Agent, or Firm*—Ronald E. Greigg

(57) ABSTRACT

In a control valve for an injector, having a first and second valve bodies in which a valve seat is embodied in the first valve body. A control spool which is displaceably disposed in the first valve body and has a valve face which cooperates with the valve seat. Such a structure requires very little effort or expense to make the control valve and to provide a hydraulic step-up chamber in the second valve body. The control spool is provided with a guide extension, whose outer diameter is approximately equal to or slightly less than the diameter of the valve seat, and that a guide bush is disposed in the valve body and the guide extension of the control spool is displaceably received in the guide bush, and the outer diameter of the guide bush is greater than or equal to the outer diameter of the control spool.

19 Claims, 2 Drawing Sheets

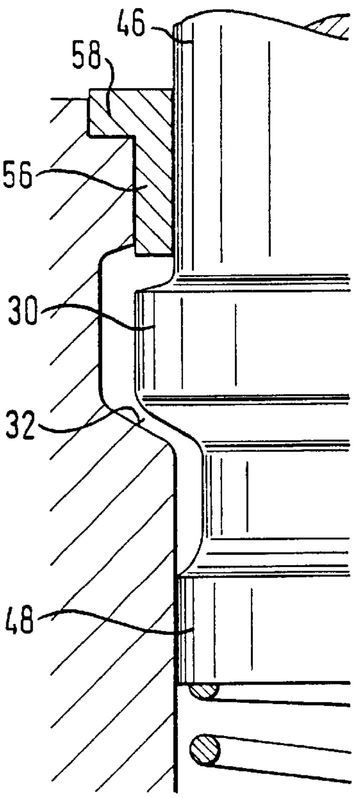
FIG. 4
FIG. 3
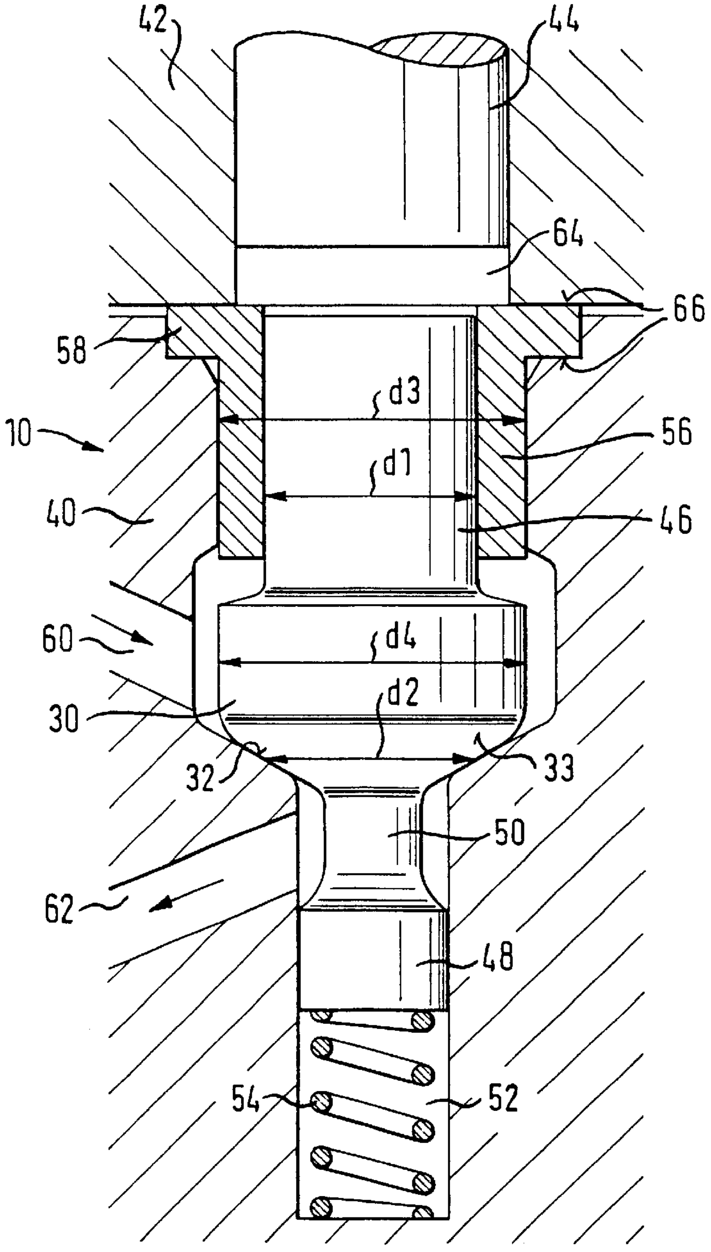

CONTROL VALVE FOR AN INJECTOR THAT INJECTS FUEL INTO A CYLINDER OF AN ENGINE

FIELD OF THE INVENTION

The invention relates to a control valve for an injector, having a valve body in which a valve seat is embodied, and having a control spool which is displaceably disposed in the valve body and has a valve face which cooperates with the valve seat.

BACKGROUND OF THE INVENTION

One such control valve is known for instance from German Patent Disclosure DE 197 27 896 A1 and serves to bring about the opening of a valve needle in order to inject fuel into a cylinder of an internal combustion engine. To make the forces acting on the control spool of the control valve as slight as possible, force-balanced control valves are used, in which the operating medium, that is switched, which is at high pressure, exerts a total zero or only slight force on the control spool.

OBJECT AND SUMMARY OF THE INVENTION

The control valve according to the invention has the advantage of being especially simple to assemble, even though because of the geometry of the control spool and the guide extension, a balanced control valve is realized. Although the control spool must have a larger diameter than the guide extension and the valve seat, so that reliable sealing of the valve seat is assured, problem-free assembly of the control valve is possible because of the guide bush. Several tasks can be performed simultaneously by the guide bush, such as a sealing function.

Advantageous refinements of and improvements to the control valve defined herein are possible by means of the provisions recited in the disclosure.

In a preferred embodiment, it is provided that the control spool, on its side remote from the guide extension, is provided with a centering extension, which is received displaceably in a bore in the valve body. The centering extension improves the positioning of the control spool relative to the valve seat, so that optimal tightness is assured.

It is also provided that a compression spring is disposed between the centering extension and the bottom of the bore; that an outflow bore leads away from a chamber that is embodied between the valve seat and the centering extension; and that a delivery bore discharges into a chamber that is formed between the guide bush and the valve seat. The compression spring presses the control spool away from the valve seat, so that when a suitable counter force is absent, the opening of the valve is brought about. A compact overall design is obtained by means of the disposition of the outflow bore and the delivery bore.

Furthermore, an actuator can be provided, which can act on the guide extension via a hydraulic step-up chamber. The hydraulic step-up chamber makes it possible for the actuating force of the actuator and its actuation stroke to be converted into values that are suitable for actuating the control spool. The requisite adaptation can be attained in a simple way through the choice of a suitable cross-sectional ratio between the cross section of the guide extension and the cross section of an actuating piston of the actuator.

Preferably, the hydraulic step-up chamber communicates with the delivery bore. This can be attained for instance by means of a slight leakage flow between the guide extension and the guide bush. In this way, no separate supply for the hydraulic step-up chamber is needed.

The actuator can be a piezoelectric actuator. An actuator of this kind can be triggered with only very slight power.

According to a preferred embodiment of the invention, the valve body is embodied in two parts, and the guide bush is provided with a collar that provides sealing between the two parts of the valve body. In this version, the guide bush is automatically fixed between the two parts of the valve body without requiring a separate fastener. Also, the guide bush can be used to assure the sealing of the hydraulic step-up chamber.

The invention will be better understood and further objects and advantages thereof will become more apparent from the ensuing detailed description of a preferred embodiment taken in conjunction with the drawing.

BRIEF DESCRIPTION OF THE DRAWING

FIG. 3 is a longitudinal section through a control valve of the invention; and FIG. 4 is an enlarged view of a detail of FIG. 3.

DESCRIPTION OF THE PREFERRED EMBODIMENT

Figure 2:
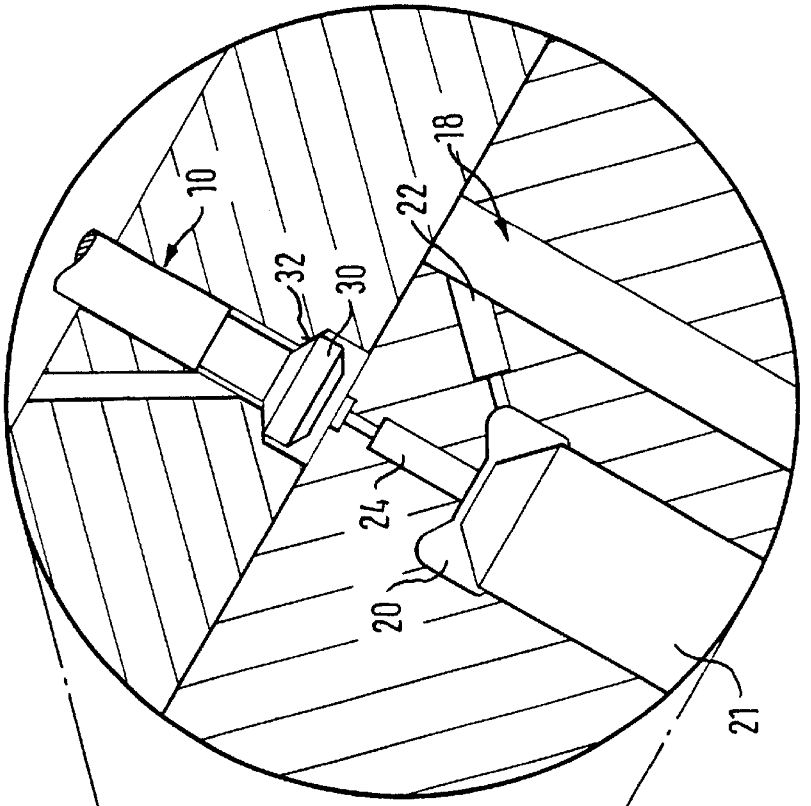
FIG. 2 is an enlarged view of a control valve according to the prior art that has been used in a prior art fuel injection valve such as shown in FIG. 1.
Figure 1:
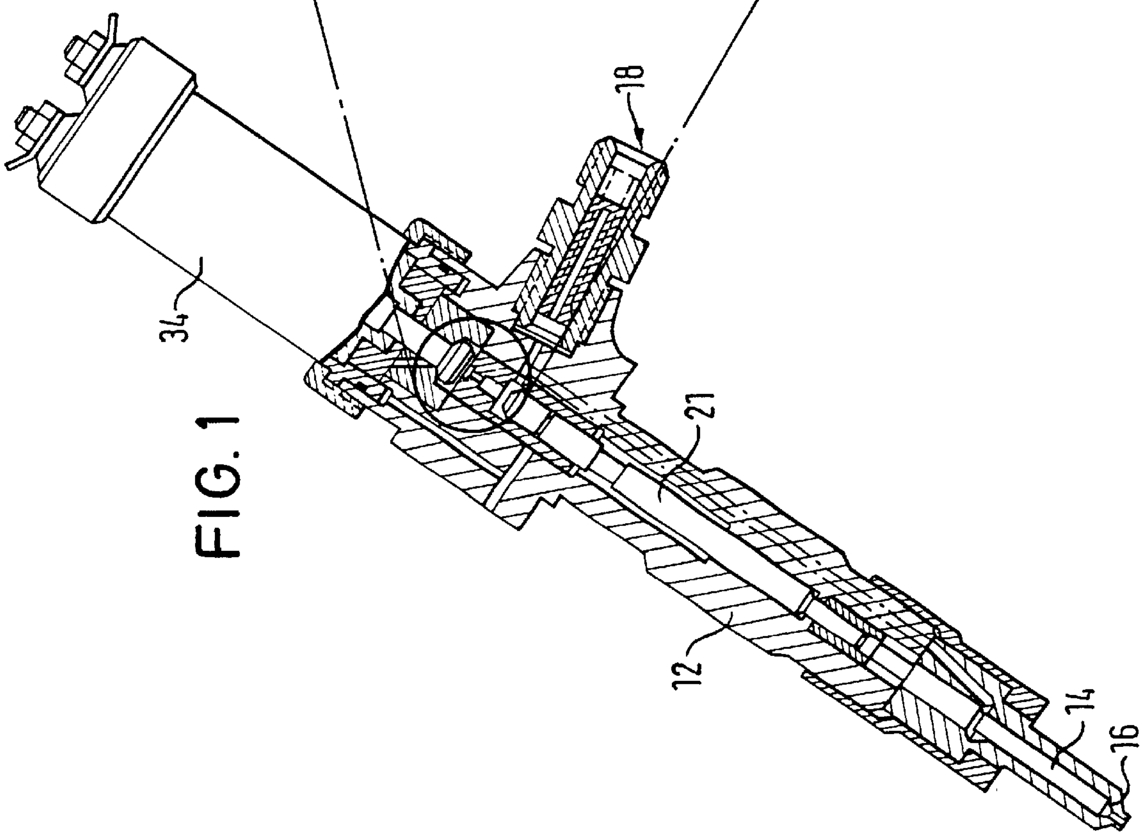
FIG. 1 is a schematic sectional view of a control valve and an injector.

The control valve 10 according to the invention is used for actuating an injector 12. The injector comprises a valve needle 14, which cooperates with a valve seat 16 to control the injection of delivered fuel 18 into a cylinder of an internal combustion engine. The opening of the valve needle 14 is controlled by means of a control pressure chamber 20, which acts on an actuation part 21, one end of the actuation part 21 extends toward one end and contacts the valve needle 14. The control pressure chamber is provided with an inlet line 22 for the fuel 18 and with an outlet line 24 that leads to the control valve 10.

The control valve 10 has a control spool 30, which is provided with a valve face 33 that cooperates with a valve seat 32. An actuator 34 is provided, which is capable of adjusting the control spool 30.

When the control spool 30 is contacting the valve seat 32, the fuel is dammed up in the control pressure chamber 20, so that a pressure that presses the valve needle 14 against the valve seat 16 acts on the actuation part 21. Conversely, if the actuator causes the control spool 30 to lift away from the valve seat 32, the fuel flows via the outlet line 24 out of the control pressure chamber 20, so that the pressure in the control chamber drops. The opening pressure acting on the valve needle is then capable of lifting the valve needle from the valve seat.

The structure of the control valve of the invention will now be described in conjunction with FIGS. 3 and 4.

The control valve 10 has two valve body parts 40, 42; the control spool is disposed in the valve body part 40, and an actuating piston 44 associated with the actuator is disposed in the valve body part 42.

The control spool 30 is provided with a guide extension 46, which has a cylindrical cross section. On its side remote from the guide extension 46, the control spool 30 is provided with a centering extension 48, which is joined to the control spool 30 by a connecting portion 50 of reduced cross section. The centering extension 48 can slide in a bore 52. A compression spring 54 is also disposed in this bore and is supported on the bottom of the bore and on the centering extension 48.

The guide extension 46 is received displaceably in a guide bush 56 that is provided with a collar 58. The collar is received in the first valve body part 40 in such a way that the outer face of the guide bush protrudes slightly past the outer face of the first valve body part 40.

The diameter d1 of the guide extension 46 is selected to be equal to the diameter d2 of the valve seat 32, or slightly less than the diameter d2. In this way, a force-balanced control valve is obtained. The outer diameter d3 of the guide bush 56 is also equal to the outer diameter d4 of the control spool 30, or slightly larger. In this way, problem-free mounting of the control spool 30 in the first valve body part 40 is possible.

A delivery bore 60 for the operating medium to be switched discharges into a chamber between the valve seat 32 and the guide bush 56, and an outflow bore 62 for the medium to be switched discharges into the chamber between the valve seat 32 and the centering extension 48.

Between the guide extension 46 and the actuating piston 44, a hydraulic step-up chamber 64 is formed, which serves to convert the actuation force and actuation stroke of the actuating piston 44. The hydraulic step-up chamber 64 is sealed off by means of the collar 58 of the guide bush 56; with two sealing faces 66, the collar acts between the two valve body parts 40, 42. The step-up chamber 64 is assured by a leakage flow between the guide extension 46 and the guide bush 56, out of the chamber that communicates with the delivery bore 60. With this construction, accordingly, neither a separate step-up chamber that is difficult to seal off nor a separate delivery for this step-up chamber are necessary.

The foregoing relates to a preferred exemplary embodiment of the invention, it being understood that other variants and embodiments thereof are possible within the spirit and scope of the invention, the latter being defined by the appended claims.

I claim:

1. A control valve for a fuel injector, comprising first and second valve bodies (40, 42) in which a valve seat (32) is embodied in the first valve body (40), a control spool (30) which is displaceably disposed in the first valve body (40) and has a valve face (33) which cooperates with the valve seat (32), the control spool is provided with a guide extension (46), which has an outer diameter which is approximately equal to or slightly less than a diameter of the valve seat (32), and that a guide brush (56) is disposed in the first valve body (40) and the guide extension (46) of the control spool is displaceably received in the guide bush, and an outer diameter of the guide bush (56) is greater than or equal to an outer diameter of the control spool (30).

2. The control valve according to claim 1, in which the control spool (30), on a side remote from the guide extension (46) is provided with a centering extension (48), which is received displaceably in a bore (52) in the first valve body (40).

3. The control valve according to claim 2, in which a compression spring (54) is disposed between the centering extension (48) and a bottom of the bore (52); that an outflow bore (62) leads away from a chamber that is embodied between the valve seat (32) and the centering extension (48); and that a delivery bore (60) discharges into a chamber that is formed between the guide bush (56) and the valve seat (32).

4. The control valve according to claim 3, in which an actuator (34) is provided, which acts on the guide extension (46) via a hydraulic step-up chamber (64) in the second valve body (42).

5. The control valve according to claim 4, in which the hydraulic step-up chamber (64) communicates with the delivery bore (60).

6. The control valve according to claim 4, in which the actuator (34) is a piezoelectric actuator.

7. The control valve according to claim 3, in which the hydraulic step-up chamber (64) communicates with the delivery bore (60).

8. The control valve according to claim 7, in which the first and second valve bodies (40, 42) are embodied in two separate parts, and the guide bush (56) is provided with a collar (58) that provides sealing between the two separate body parts (40, 42) of the valve body.

9. The control valve according to claim 3, in which the first and second valve bodies (40, 42) are embodied in two separate parts, and the guide bush (56) is provided with a collar (58) that provides sealing between the two separate body parts (40, 42) of the valve body.

10. The control valve according to claim 2, in which an actuator (34) is provided, which acts on the guide extension (46) via a hydraulic step-up chamber (64) in the second valve body (42).

11. The control valve according to claim 10, in which the hydraulic step-up chamber (64) communicates with a delivery bore (60).

12. The control valve according to claim 10, in which the actuator (34) is a piezoelectric actuator.

13. The control valve according to claim 2, in which the first and second valve bodies (40, 42) are embodied in two separate parts, and the guide bush (56) is provided with a collar (58) that provides sealing between the two separate body parts (40, 42) of the valve body.

14. The control valve according to claim 1, in which an actuator (34) is provided, which acts on the guide extension (46) via a hydraulic step-up chamber (64) in the second valve body (42).

15. The control valve according to claim 1, in which the hydraulic step-up chamber (64) communicates with the delivery bore (60).

16. The control valve according to claim 14, in which the actuator (34) is a piezoelectric actuator.

17. The control valve according to claim 16, in which the first and second valve bodies (40, 42) are embodied in two separate parts, and the guide bush (56) is provided with a collar (58) that provides sealing between the two separate body parts (40, 42) of the valve body.

18. The control valve according to claim 1, in which the first and second valve bodies (40, 42) are embodied in two separate parts, and the guide bush (56) is provided with a collar (58) that provides sealing between the two separate body parts (40, 42) of the valve body.

19. The control valve according to claim 1, in which the first and second valve bodies (40, 42) are embodied in two separate parts, and the guide bush (56) is provided with a collar (58) that provides sealing between the two separate body parts (40, 42) of the valve body.

* * * * *